W. J. TURNBULL.
CONVEYER.
APPLICATION FILED SEPT. 22, 1911.
1,026,617.
Patented May 14, 1912.
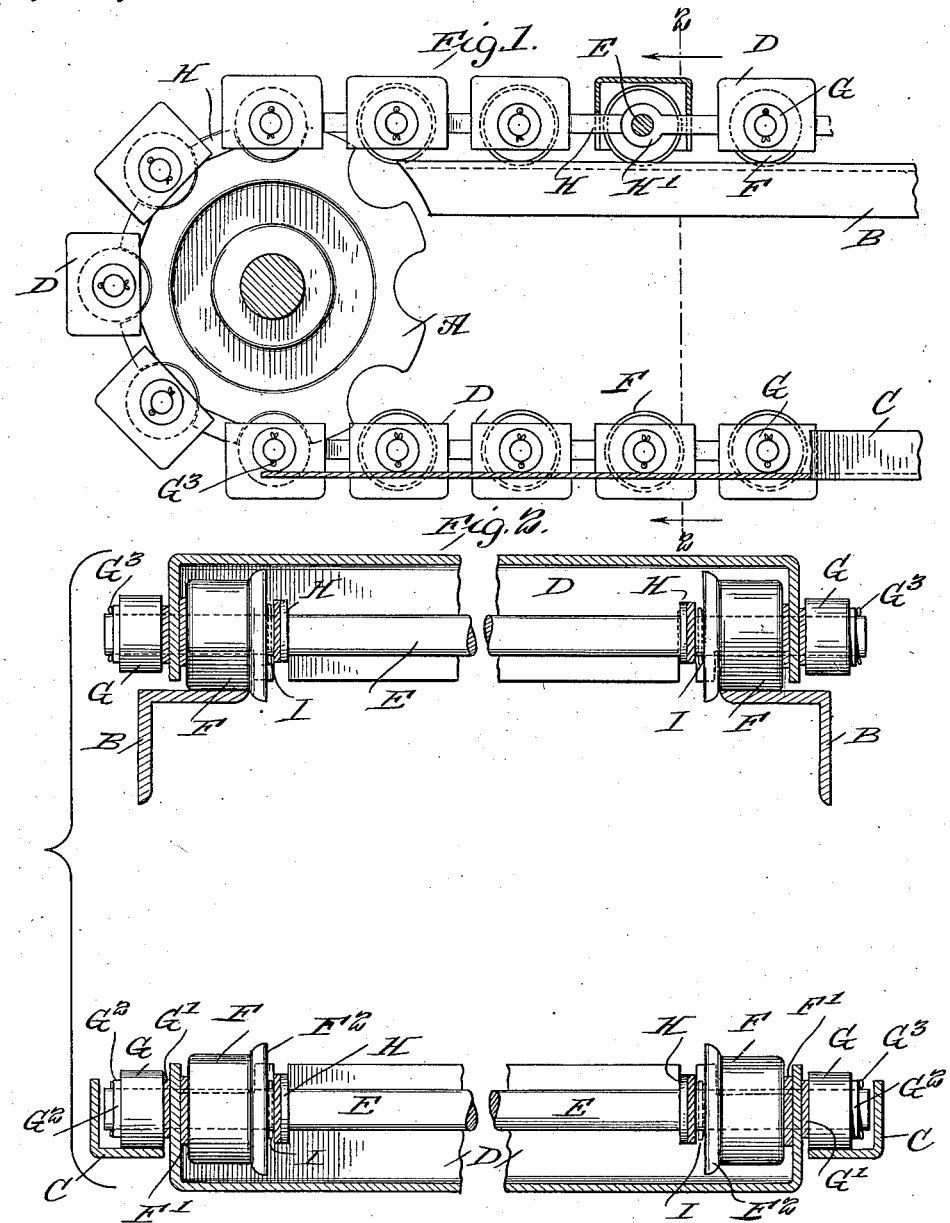
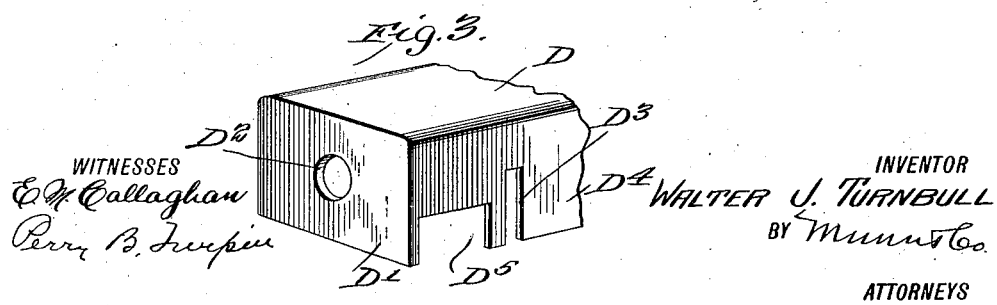
WITNESSES
E. H. Callaghan
Perry B. Turpin
INVENTOR
WALTER J. TURNBULL
BY Munn & Co.
ATTORNEYS

UNITED STATES PATENT OFFICE.

WALTER J. TURNBULL, OF NEW ORLEANS, LOUISIANA.

CONVEYER.

1,026,617.

Specification of Letters Patent. Patented May 14, 1912.

Application filed September 22, 1911. Serial No. 650,717.

*To all whom it may concern:*

Be it known that I, WALTER J. TURNBULL, a citizen of the United States, and a resident of New Orleans, in the parish of Orleans and State of Louisiana, have invented certain new and useful Improvements in Conveyers, of which the following is a specification.

This invention is an improvement in conveyers and consists in certain novel constructions, combinations and arrangements of parts as will be hereinafter described and claimed.

In the drawing Figure 1 is a side view, partly broken away and partly in section, of a conveyer embodying my invention. Fig. 2 is a cross section thereof showing the upper and lower runs of the endless conveyer. Fig. 3 is a detail perspective view of one end of one of the metallic slats.

By the invention, I seek to provide a conveyer especially designed for use in carrying bags of merchandise or other objects which may be rested upon the metallic slats and conveyed along by the movement thereof.

As will be understood from Fig. 1, it is designed to make the conveyer in the form of an endless carrier passing around sprocket wheels A, the slats and connected parts forming what may be termed a conveyer chain. I also provide an upper track B and a lower track C, both being preferably of angle form as shown in Fig. 2.

The conveyer chain comprises the slats D, shafts E, rollers F to run upon the upper track B for bearing the load and rollers G which run upon the lower track and support the endless carrier on the return run thereof. As shown, the slats D have end plates D' provided with holes D² through which the shafts E project, said shafts extending beyond the end plates D' to form spindles for the rollers G, washers G' and G² being provided on the inner and outer sides of the rollers G and the said rollers being held upon the shafts E by cotter pins G³ as shown in the drawing.

It will be noticed that the rollers G are outside of the slats while the rollers F are journaled on the slats within the same and close to the end plates D', being spaced from the latter by washers F' and being provided at their inner ends with flanges F² as best shown in Fig. 2 of the drawing. Links H extend between the adjacent shafts E, thus connecting the slats together. These links H extend continuously from the shaft of one slat to that of the adjacent slat, no joint being formed in the links between the adjacent slats and when the links are applied as shown in Fig. 2, it is manifest they will operate to prevent or limit the inward movement of the rollers F along their shafts. I prefer, however, to provide a special means for preventing such inward movement of the rollers F and have shown the same as consisting of keys I, one for each of the rollers F and extending through their respective shafts E adjacent to the inner ends of their rollers in such manner as to prevent the rollers from exerting any lateral pressure upon the eyes H' of the links, which eyes encircle their shafts E as will be understood from Fig. 1 of the drawing. By this means the keys I which may be cotter pins or other suitable construction, operate to limit the inward movement of the rollers F independently of the links which connect the adjacent slats.

The links H extend through slots D³ in the side plates D⁴ of the slats D, such slots being open at the edges of the side plates D⁴ and being so formed that on the upper run of the conveyer as shown in Fig. 1 the slats rest upon the links H and are firmly supported thereby in carrying the load. At the same time the slotted form of the openings D³ permit the movement of the links as shown in Fig. 1 in rounding the sprocket wheel A and any jointing of the said links between the slats is avoided by slotting the openings D³ as before described.

The slats are preferably hollow pressed steel and by the described construction I am able to provide a conveyer chain of practically unlimited strength made up of few parts without bolts or nuts and which can be made in different sizes to suit the demand and can be instantly repaired, the repairs being facilitated in practice by having on hand duplicate parts.

As best shown at D⁵ in Fig. 3, the side plates D⁴ of the slats are notched to avoid any interference in rounding the sprocket wheel.

I claim:

1. A conveyer, substantially as described, comprising a plurality of slats having end plates provided with shaft openings and side plates provided with notches to avoid sprocket wheels and with slots for the passage of connecting links, shafts extended through the openings in the end plates and projecting beyond the ends of the slats, rollers on the shafts outside of the slats, rollers on the shafts within the slats and adjacent to the end plates thereof, links connecting the shafts of the adjacent slats and extending through the slots in the side plates and continuous or free of joints between the shafts they connect and upper and lower tracks for respectively the inner and outer rollers of the slats, all substantially as and for the purposes set forth.

2. A conveyer comprising a slat, a roller within the slat for bearing the load and a roller beyond the slat for supporting the same on the return run of the conveyer.

3. The combination in a conveyer with a sprocket wheel and a conveyer chain rounding the same and having slats provided with end plates having notches for the sprocket wheel and slots for the passage of connecting links and links extending continuously between the shafts of the adjacent slats and through the slots in the side plates of said slats, substantially as set forth.

WALTER J. TURNBULL.

Witnesses:
J. E. TURNBULL,
C. M. HERO.

Copies of this patent may be obtained for five cents each, by addressing the "Commissioner of Patents, Washington, D. C."